United States Patent

Shono et al.

[11] Patent Number: 6,116,618
[45] Date of Patent: Sep. 12, 2000

[54] VEHICULAR SLOPE DETERMINATION APPARATUS AND VEHICLE HEIGHT ADJUST CONTROL APPARATUS AND VEHICLE HEIGHT ADJUST CONTROL APPARATUS AND METHOD USING THE SAME

[75] Inventors: Shoichi Shono, Nishikamo-gun; Atushi Sato, Susono, both of Japan

[73] Assignee: Toyota Jidosha Kabushiki Kaisha, Toyota, Japan

[21] Appl. No.: 09/166,079

[22] Filed: Oct. 5, 1998

[30] Foreign Application Priority Data

Dec. 26, 1997 [JP] Japan .................................. 9-359907

[51] Int. Cl.[7] .............................. G06F 17/00; G01B 7/30
[52] U.S. Cl. .................................. 280/5.501; 280/5.513; 280/5.514; 33/333
[58] Field of Search ........................... 33/333, 335, 365, 33/336, 337, 600, 366; 340/146.2; 180/41; 280/5.5, 5.504, 5.513, 6.154, 5.501, 5.514

[56] References Cited

U.S. PATENT DOCUMENTS

| | | | |
|---|---|---|---|
| 3,409,991 | 11/1968 | Davis et al. | 33/335 |
| 3,422,544 | 1/1969 | Wyse | 33/333 |
| 4,561,299 | 12/1985 | Orlando et al. | 33/366.14 |
| 4,586,150 | 4/1986 | Budzial et al. | 33/366.14 |
| 4,763,745 | 8/1988 | Eto et al. | 280/5.5 |
| 4,911,468 | 3/1990 | Fukunaga | 280/5.5 |
| 4,965,878 | 10/1990 | Yamagiwa et al. | 280/5.504 |
| 4,973,080 | 11/1990 | Ikemoto et al. | 280/5.504 |
| 5,013,067 | 5/1991 | Mine et al. | 280/6.154 |
| 5,446,662 | 8/1995 | Kojima et al. | 180/41 |
| 5,802,478 | 9/1998 | Iwasaki | 180/41 |

FOREIGN PATENT DOCUMENTS

| | | | |
|---|---|---|---|
| 60-92912 | 5/1985 | Japan . | |
| 60-131308 | 7/1985 | Japan . | |
| 48508 | 8/1985 | Japan | 180/41 |
| 48709 | 9/1987 | Japan | 33/335 |
| 48808 | 8/1988 | Japan | 33/335 |
| 2-6210 | 1/1990 | Japan . | |
| 96612 | 9/1990 | Japan | 33/335 |

Primary Examiner—Diego Gutierrez
Assistant Examiner—Marie Fernandez
Attorney, Agent, or Firm—Oliff & Berridge, PLC

[57] ABSTRACT

A vehicle height adjust control apparatus, incorporating a slope determination apparatus, has a vehicle speed sensor, a vehicle height detector that detects a rear vehicle height of a rear portion of a vehicle body and front vehicle heights at the right and left front wheel positions, and actuators for changing the front and rear vehicle heights. In a case where the detected vehicle speed or an acceleration calculated from the detected vehicle speed is small and where the difference between the detected front vehicle heights at the right and left wheel positions is small and the averaged front vehicle height considerably deviates from a target vehicle height, a microcomputer determines that the vehicle is on a steep slope. When it is determined so, the microcomputer inhibits automatic vehicle height adjust control including the control of the actuators, thereby preventing undesired events that immediately after the vehicle moves from the steep slope onto a horizontal road, the vehicle has an awkwardly tilted appearance or the vehicle body interferes with a road surface.

15 Claims, 7 Drawing Sheets

VEHICULAR SLOPE DETERMINATION APPARATUS AND VEHICLE HEIGHT ADJUST CONTROL APPARATUS AND VEHICLE HEIGHT ADJUST CONTROL APPARATUS AND METHOD USING THE SAME

BACKGROUND OF THE INVENTION

1. Field of Invention

The present invention relates to a vehicular slope determination apparatus and method for determining whether a vehicle is on a slope and to a vehicle height adjust control apparatus using the slope determination apparatus.

2. Description of Related Art

Japanese Patent Application Laid-Open No. SHO 60-92912, for example, describes a technology wherein a slope angle of a road surface (inclination angle of a vehicle body) is detected using a slope angle sensor mounted on the vehicle body and, when the detected upslope angle of the road surface becomes greater, the vehicle height of a rear portion of the vehicle body is increased relative to the vehicle height of a front portion of the vehicle body, so as to eliminate the problem of a reduction of the driver's visual field caused by gravity pulling the driver backward when the vehicle is running on an upslope. Japanese Patent Application Laid-Open No. SHO 60-131308, for example, describes a technology wherein a slope angle sensor is mounted on a vehicle body and, based on the slope angle of the vehicle body detected by the slope angle sensor and vehicle heights detected by vehicle height sensors disposed at individual wheel positions, the vehicle height is controlled so that during travel in a straight line, the vehicle body is maintained horizontally regardless of the inclination angle of the road surface and, during turning at a curve, the vehicle body is inclined in accordance with the centrifugal force. Japanese Patent Application Laid-Open No. SHO 60-131308 also describes an inclination angle sensor wherein a resistor member and an electric conductor member are curved at a predetermined curvature, and arranged in parallel and horizontally, and an electric conductor ball is provided for moving while contacting the resistor member and the electric conductor member at points and, with a predetermined voltage applied to the resistor member, a voltage corresponding to the position of the electric conductor ball is extracted.

However, in the inclination sensor according to the conventional technology described above, it is difficult to always maintain the electric conductor ball stably on the resistor member and the electric conductor member. Therefore, it becomes impossible to always detect the inclination of the vehicle body, that is, the inclination of the road surface, with good stability and precision. Furthermore, this mechanical inclination angle sensor has a complicated construction and requires a high production cost, as in typical mechanical sensors. Furthermore, if vehicle height adjustment is performed when the vehicle is running or stopped on a slope, in particular, a steep slope (for example, a slope at or above an angle of about 30°), a large vehicle height difference between the front and rear portions of the vehicle body results and an appropriate vehicle height adjustment relative to the road surface fails immediately after the vehicle moves from the slope onto a substantially horizontal road, thereby causing problems of interference between the vehicle body and a road surface and the like.

SUMMARY OF THE INVENTION

Accordingly, it is an object of the present invention to provide a simply-constructed vehicular slope determination apparatus and method capable of determining whether the vehicle is on a slope and to provide a vehicle height adjust control apparatus that inhibits vehicle height adjustment while the vehicle is running or stopped on a steep slope, so as to eliminate the problems of interference between the vehicle body and a road surface and the like after the vehicle moves from the slope onto a substantially horizontal road.

According to one aspect of the invention, there is provided a vehicular slope determination apparatus including a running state detector that detects a running state of a vehicle, a vehicle height detector that detects a vehicle height of a vehicle, and a determination device for, if the running state detected by the running state detector is a predetermined state and the vehicle height detected by the vehicle height detector is shifted at least a predetermined value from a predetermined target vehicle height, determining that the vehicle is on a slope. The running state detector may detect a vehicle speed, and the determination device may determine whether the running state is a stopped state or a low-speed running state where the vehicle speed is less than a predetermined speed.

If an ordinary vehicle is on a steep slope (for example, at or above a slope angle of about 30°), it is impossible for the ordinary vehicle to run at an intermediate or high speed and, therefore, the vehicle is in a low-speed running state or a stopped state, so that the vehicle body does not oscillate up and down to great extents. If the vehicle is on an upslope that ascends in the travelling direction of the vehicle, the front portion of the vehicle body rises and the rear portion of the vehicle body lowers. If the vehicle is on a downslope that descends in the travelling direction of the vehicle, the front portion of the vehicle body lowers and the rear portion of the vehicle body rises. Therefore, if the predetermined vehicle speed is set to a suitably small value, the determination device, employing the determination conditions that the vehicle speed is less than the predetermined vehicle speed and that the detected vehicle height of the front or rear portion of the vehicle body is shifted at least the predetermined value from the predetermined target vehicle height, is able to determine whether the vehicle is on a slope. The vehicle speed detector may include a vehicle speed sensor or the like that is normally installed in vehicles. The vehicle height detector may include vehicle height sensors or the like that are normally installed in vehicles for the purpose of vehicle height adjustment and the like. The determination device may include a circuit device that is normally installed in vehicles, for example, a microcomputer and the like. Consequently, the vehicular slope determination apparatus can easily be constructed at low production costs.

The vehicular slope determination apparatus may further have a construction wherein the vehicle height detector detects a vehicle height at each of right and left positions in at least one of the front portion of the vehicle and the rear portion of the vehicle, and includes a device for determining a vehicle height of the at least one of the front portion of the vehicle and the rear portion of the vehicle by averaging the vehicle heights detected at the right and left positions, and wherein the determination device determines whether a difference between the vehicle height at the right position and the vehicle height at the left position is less than a predetermined value and whether the determined vehicle height of the at least one of the front portion of the vehicle and the rear portion of the vehicle is shifted at least the predetermined value from the predetermined target vehicle height. In this construction, the condition that the difference between the vehicle heights detected at the right and left positions is less than the predetermined value is added as a condition for determining that the vehicle is on a slope. Therefore, if the vehicle is on a bumpy road and one of the right and left front wheels or one of the right and left rear wheels is in a recess of the road or on a protuberance of the road so that the front or rear vehicle height is shifted the predetermined value from the target vehicle height, it is not determined that the vehicle is on a slope. Consequently, the determination as to whether the vehicle is on a slope becomes more precise.

Furthermore, in the vehicular slope determination apparatus, the running state detector may detect an acceleration of the vehicle in a forward-rearward direction, and the determination device may determine whether the acceleration detected by the running state detector is less than a predetermined acceleration and whether the running state is other than a rapidly accelerating or decelerating state. If the determination device determines that the detected acceleration is less than the predetermined acceleration and determines that the detected vehicle height is shifted at least the predetermined value from the target vehicle height, it is then determined that the vehicle is on a slope.

Therefore, if the vehicle is on a steep slope (for example, at or above a slope angle of 30°), the front and rear vehicle heights change following the direction of the slope unless the vehicle is rapidly accelerated or decelerated so that the front of the vehicle body is considerably raised or lowered. More specifically, if the vehicle is on an upslope that ascends in the travelling direction of the vehicle, the front portion of the vehicle body rises and the rear portion of the vehicle body lowers. If the vehicle is on a downslope that descends in the travelling direction of the vehicle, the front portion of the vehicle body lowers and the rear portion of the vehicle body rises. Therefore, if the predetermined acceleration is set to a suitable value at which the front or rear portion of the vehicle is not considerably raised or lowered, the determination device, employing the determination conditions that the forward-rearward acceleration is less than the predetermined acceleration and that the detected vehicle height of the front or rear portion of the vehicle body is shifted at least the predetermined value from the predetermined target vehicle height, is able to determine whether the vehicle is on a slope. The acceleration may be detected by differentiating the vehicle speed or using a simply-constructed acceleration sensor. The vehicle height detector may also include vehicle height sensors or the like that are normally installed in vehicles for the purpose of vehicle height adjustment and the like. The determination device may include a circuit device that is normally installed in vehicles, for example, a microcomputer and the like. Consequently, the vehicular slope determination apparatus can easily be constructed at low production costs.

According to another aspect of the invention, there is provided a vehicle height adjust control apparatus including a front vehicle height detector that detects a front vehicle height of a front portion of a vehicle, a rear vehicle height detector that detects a rear vehicle height of a rear portion of the vehicle, an actuator capable of changing the front vehicle height of the front portion of the vehicle, and the rear vehicle height of the rear portion of the vehicle, an adjust controller that adjusts the front vehicle height of the front portion of the vehicle and the rear vehicle height of the rear portion of the vehicle so that the front vehicle height and the rear vehicle height become substantially equal to respective predetermined target vehicle heights, by controlling the actuator on the basis of the front vehicle height detected by the front vehicle height detector and the rear vehicle height detected by the rear vehicle height detector, a running state detector that detects a running state of the vehicle, a determination device for, if the running state detected by the running state detector is a predetermined state and at least one of the front vehicle height detected by the front vehicle height detector and the rear vehicle height detected by the rear vehicle height detector is shifted at least a predetermined value from a corresponding one of the predetermined target vehicle heights, determining that the vehicle is on a slop, and an inhibition device for inhibiting vehicle height adjust control by the adjust controller if the determination device determines that the vehicle is on a slope.

In the vehicle height adjust control apparatus of the second aspect of the invention, it is substantially determined whether the vehicle is on a slop, as described above in conjunction with the first aspect of the invention. When it is determined that the vehicle is on a slop, the control of vehicle height adjustment is inhibited. Therefore, it is possible to prevent a situation where, immediately after the vehicle has moved from a slope onto a substantially horizontal road, the vehicle has an awkward appearance with considerably different vehicle heights of the front and rear portions of the vehicle body, or the vehicle body interferes with a road surface or the like. Furthermore, the vehicle height adjust control is inhibited in a case, for example, where the lower surface of the front or rear end of the vehicle body gets on a protuberance of a road surface, much as a rock or the like, when, for example, the vehicle is about to be parked, so that the vehicle height of the front or rear portion of the vehicle body becomes very high, regardless of whether the vehicle is on a slope. Therefore, the vehicle height adjust control apparatus of the invention advantageously prevents the vehicle height adjust control from continuing to reduce the vehicle height of the front or rear portion of the vehicle body in the aforementioned case and therefore avoids worsening the situation, that is, prevents an event that the lower surface of the front or rear end of the vehicle body becomes tightly pressed against the protuberance of the road surface.

The vehicle height adjust control apparatus of the invention may further include a door open-closed detector that detects an open state of a door and a closed state of the door, and a door controller that if the open state of the door is detected by the door open-closed detector, prevents vehicle height adjustment from being inhibited by the inhibition device, and allows vehicle height adjustment to be performed by the adjust controller.

With this optional construction, the vehicle height adjust control is performed in a case where any of the doors of the vehicle is open and, therefore, there is a possibility that the number of occupants or the total weight of baggage may be changed so that the vehicle height of the front or rear portion of the vehicle may be considerably shifted from the target vehicle height. Therefore, it is possible to prevent an event that due to a change in the number of occupants or the total weight of baggage, the vehicle height of a portion of the vehicle is reduced so that a portion of the vehicle body interferes with a road surface. This event more frequently occurs than the situation where the vehicle is on a steep slope. Consequently, the interference between the vehicle body and a road surface can be more effectively prevented.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENTS

Figure 1:
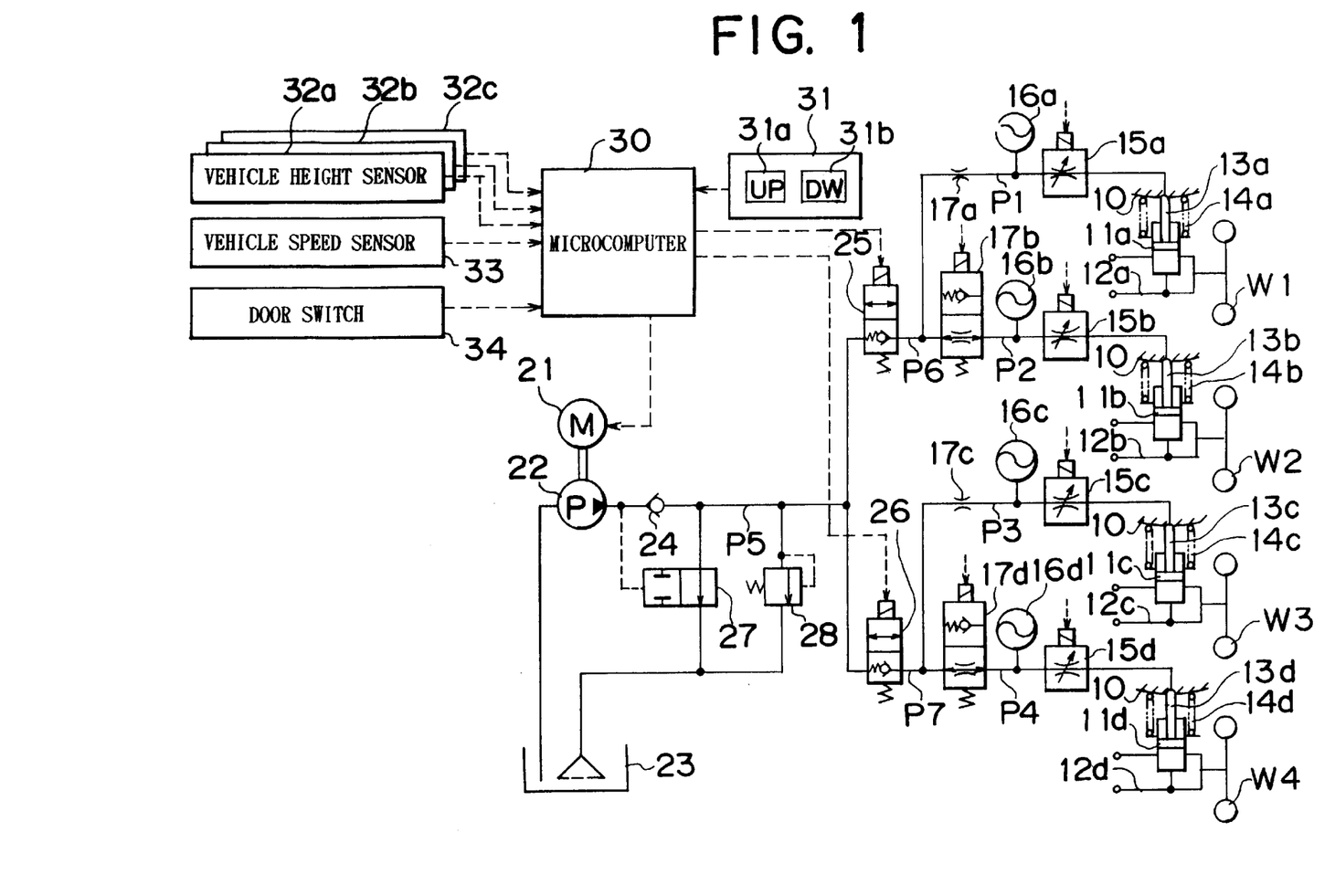
FIG. 1 is a schematic diagram of the overall construction of a vehicle height adjust control apparatus including a slope determination apparatus according to a first embodiment of the invention.

A preferred embodiment of the present invention will be described in detail hereinafter with reference to the accompanying drawings. FIG. 1 is a schematic illustration of the overall construction of a vehicle height adjust control apparatus incorporating a slope determination apparatus.

The vehicle height adjust control apparatus has hydraulic cylinders 11a–11d that form hydraulic actuators for setting vehicle heights, near left and right front wheels W1, W2 and left and right rear wheels W3, W4, respectively. Each of the hydraulic cylinders 11a–11d is connected at its lower end to a lower arm 12a–12d connecting to the corresponding one of the wheels W1–W4. A piston rod 13a–13d of each hydraulic cylinder 11a–11d protrudes from an upper surface thereof. Upper end portions of the piston rods 13a–13d are fixed to a vehicle body 10. Hydraulic fluid is supplied to and discharged from the hydraulic cylinders 11a–11d through fluid passages P1–P4, respectively. In accordance with supply and discharge of hydraulic fluid, the hydraulic cylinders 11a–11d change the vehicle heights at the respective wheel positions.

Coil springs 14a–14d are disposed between the vehicle body 10 and the hydraulic cylinders 11a–11d, respectively. The fluid passages P1–P4 are provided with variable orifices 15a–15d, respectively. Accumulators 16a–16d are connected to the fluid passages P1–P4, respectively. In cooperation with the coil springs 14a–14d, the variable orifices 15a–15d and the accumulators 16a–16d, the hydraulic cylinders 11a–11d elastically support the vehicle body 10 relative to the wheels W1–W4, and also function as shock absorbers for damping oscillations of the vehicle body 10. The variable orifices 15a–15d are electrically controlled so as to vary their orifice openings. The control of the orifice openings of the variable orifices 15a–15d is not directly related to the invention, and will not be described.

The fluid passages P1, P2 and the fluid passages P3, P4 are connected, at their ends opposite from the hydraulic cylinders 11a, 11b and 11c, 11d, to common fluid passages, respectively. Therefore, hydraulic fluid is collectively supplied to and discharged from the hydraulic cylinders 11a, 11b through the fluid passages P1, P2, and hydraulic fluid is collectively supplied to and discharged from the hydraulic cylinders 11c, 11d through the fluid passages P3, P4. The fluid passages P2, P4 are provided with gate valves 17b, 17d formed by electromagnetic changeover valves, respectively. The gate valves 17b, 17d are in a conveying state as indicated in FIG. 1 when not energized, and they are switched to a non-conveying state when energized. The gate valves 17b, 17d are energized when the vehicle body 10 rolls, for example, at the time of cornering or turning, so as to prevent communication between the hydraulic cylinders 11a and 11b and communication between the hydraulic cylinders 11c and 11d, respectively. The operation of the gate valves 17b, 17d is not directly relevant to the invention, and the description below will be made on assumption that the gate valves 17b, 17d are always in the conveying state as indicated in FIG. 1. The fluid passages P1, P3 are provided with invariable orifices 17a, 17c, respectively, for providing the fluid passages P1, P3 with a passage resistance equivalent to that provided by orifice openings that are formed by the gate valves 17b, 17d when in the conveying state.

A hydraulic pressure supply-discharge device has a hydraulic pump 22 that is driven by an electric motor 21. The hydraulic pump 22 draws hydraulic fluid from a reservoir tank 23, and ejects it into a fluid passage P5 through a check valve 24. The fluid passage P5 divides into fluid passages P6, P7. The branch fluid passage P6 is connected to the connecting point of the fluid passages P1, P2. The branch fluid passage P7 is connected to the connecting point of the fluid passages P3, P4. The fluid passages P6, P7 are provided with leveling valves 25, 26 that are formed by electromagnetic changeover valves, respectively. The leveling valves 25, 26 remain in a non-conveying state as indicated in FIG. 1 when not energized, and they are switched to a conveying state when energized. If the hydraulic pressure in the fluid passages P1–P4 becomes abnormally high, the leveling valves 25, 26 allow discharge of hydraulic fluid from the fluid passages P1–P4 into the fluid passage P5 for protection of the apparatus even while they are in the non-conveying state.

A discharge valve 27 and a relief valve 28 are disposed between the fluid passage P5 and the reservoir tank 23. The discharge valve 27 is normally kept in a conveying state, and mechanically switched to a non-conveying state when the ejecting pressure of the hydraulic pump 22 increases. The passage area of the discharge valve 27 when the discharge valve 27 is kept in the conveying state is at least twice as large as the passage area of the leveling valves 25, 26 when they are in the conveying state. The relief valve 28 is normally kept in a non-conveying state. Only when the hydraulic pressure in the fluid passage P5 becomes very high, the relief valve 28 is switched to a conveying state to let hydraulic fluid out of the fluid passage P5 into the reservoir tank 23 for protection of the apparatus.

The electric motor 21 and the leveling valves 25, 26 are connected to a microcomputer 30 that forms an electric control device. The microcomputer 30 executes a main program illustrated in FIG. 2 (including subroutines illustrated in FIGS. 3 through 6) and a drive control program illustrated in FIG. 7 repeatedly every predetermined short length of time, thereby controlling the supply and discharge of hydraulic fluid with respect to the hydraulic cylinders 11a–11d. The microcomputer 30 is connected to a target vehicle height changing switch 31, vehicle height sensors 32a–32c, a vehicle speed sensor 33 and a door switch 34.

The target vehicle height changing switch 31 is a switch that is operated by an occupant to select vehicle heights. The target vehicle height changing switch 31 includes an up-switch 31a for increasing the present vehicle height and a down-switch 31b for reducing the present vehicle height. In this embodiment, the vehicle height can be set to three levels, a low level, an intermediate level and a high level. However, the vehicle height may also be set to any other number of levels. The vehicle height sensors 32a, 32b are disposed between the vehicle body 10 and the lower arms 12a, 12b at the left and right front wheels W1, W2, respectively. Each of the vehicle height sensors 32a, 32b detects the height of the vehicle body 10 at the left or right front wheel W1, W2 relative to a road surface (or an under-spring member), and outputs a detection signal indicating the actual vehicle height Hf1, Hf2. The vehicle height sensor 32c is disposed at a transversely middle position in a rear portion of the vehicle body 10, between the vehicle body 10 and a frame (corresponding to an under-spring member not shown) connecting the lower arms 12c and 12d. The vehicle height sensor 32c detects the height of the vehicle body 10 at the transversely middle position in the rear portion of the vehicle, relative to the road surface (or the under-spring member), and outputs a detection signal indicating the actual vehicle height Hr. The vehicle speed sensor 33 detects a vehicle speed V and outputs a detection signal indicating the vehicle speed V. The door switch 34 detects the open and closed states of the doors of the vehicle (including the trunk lid), and outputs a door switch signal DS indicating the open or closed state thereof. The door switch signal DS becomes a high level "1" when any one of the doors of the vehicle is open, and it becomes a low level "0" when all the doors of the vehicle are closed.

The operation of the thus-constructed embodiment will be described. When the ignition switch (not shown) is turned on, the microcomputer 30 executes a program (not illustrated) to initially set "0" in various flags used in programs described below, and then starts to execute the main program illustrated in FIG. 2 and the drive control program illustrated in FIG. 7 repeatedly every predetermined short period.

Figure 2:
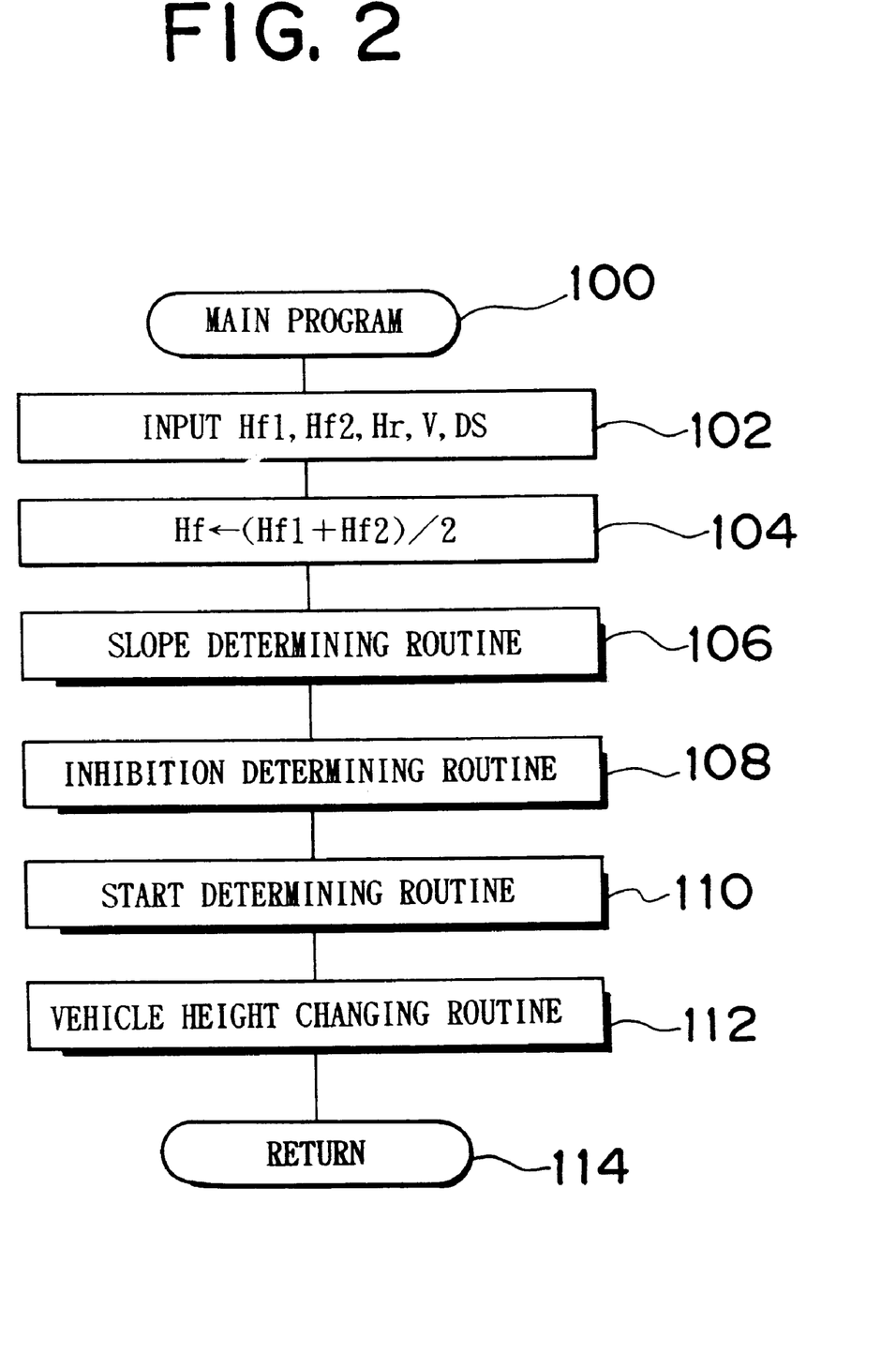
FIG. 2 is a flowchart illustrating a main program executed by the microcomputer shown in FIG. 1.

When the main program is started in step 100, the microcomputer 30 receives inputs of detection signals from the vehicle height sensors 32a–32c and the vehicle speed sensor 33 indicating the actual vehicle heights Hf1, Hf2, Hr and the vehicle speed V, and also receives an input of the door switch signal DS from the door switch 34 in step 102. If the actual vehicle heights Hf1, Hf2, Hr and the vehicle speed V from the sensors 32a–32c, 33 have instantaneous changes and therefore are not suitable for direct use in the operations by the microcomputer 30, the signals of the actual vehicle heights Hf1, Hf2, Hr and the vehicle speed V are subjected to low-pass filter processing. Subsequently, in step 104, the microcomputer 30 calculates an actual vehicle height Hf (=(Hf1+Hf2)/2) of a front portion of the vehicle body 10 by averaging the actual vehicle heights Hf1, Hf2. For example, in this embodiment, the processing of step 104 and the vehicle height sensors 32a, 32b can constitute a front vehicle height detection device. After executing step 104, the microcomputer 30 executes a slope determining routine of step 106, an inhibition determining routine of step 108, a start determining routine of step 110, and then a vehicle height changing routine of step 112. After that, the microcomputer 30 ends the execution of the main program in step 114.

The slope determining routine of step 106 will be described. This routine can constitute a slope determination device, for example, together with the vehicle speed sensor 33. The slope determining routine is illustrated in detail in FIG. 3. When the slope determining routine is started in step 200, the microcomputer 30 calculates a forward-rearward acceleration Gx of the vehicle by time-differentiating the vehicle speed V in step 202. In this embodiment, for example, the processing of step 202 and the vehicle speed sensor 33 can constitute a forward-rearward acceleration detection device. Subsequently, in step 204, it is determined whether the vehicle speed V is less than a predetermined vehicle speed V0 (for example, 5 km/h). If it is not less than the predetermined vehicle speed V0, the program operation proceeds to step 206, where it is determined whether the absolute value |Gx| of the acceleration Gx calculated in step 202 is less than a predetermined acceleration Gx0 (for example, 1.5 m/s$^2$). A vehicle speed V less than the predetermined vehicle speed V0 means that the vehicle is in a stopped state or in a very low speed running state, that is, in a substantially stopped state. The determining processing of step 204 may be replaced by another processing for determining whether the vehicle is in a substantially stopped state. An absolute value |Gx| of the acceleration Gx less than the predetermined acceleration Gx0 means that there is substantially no raising or lowering of the front or rear portion of the vehicle body 10 caused by the acceleration Gx.

Figure 3:
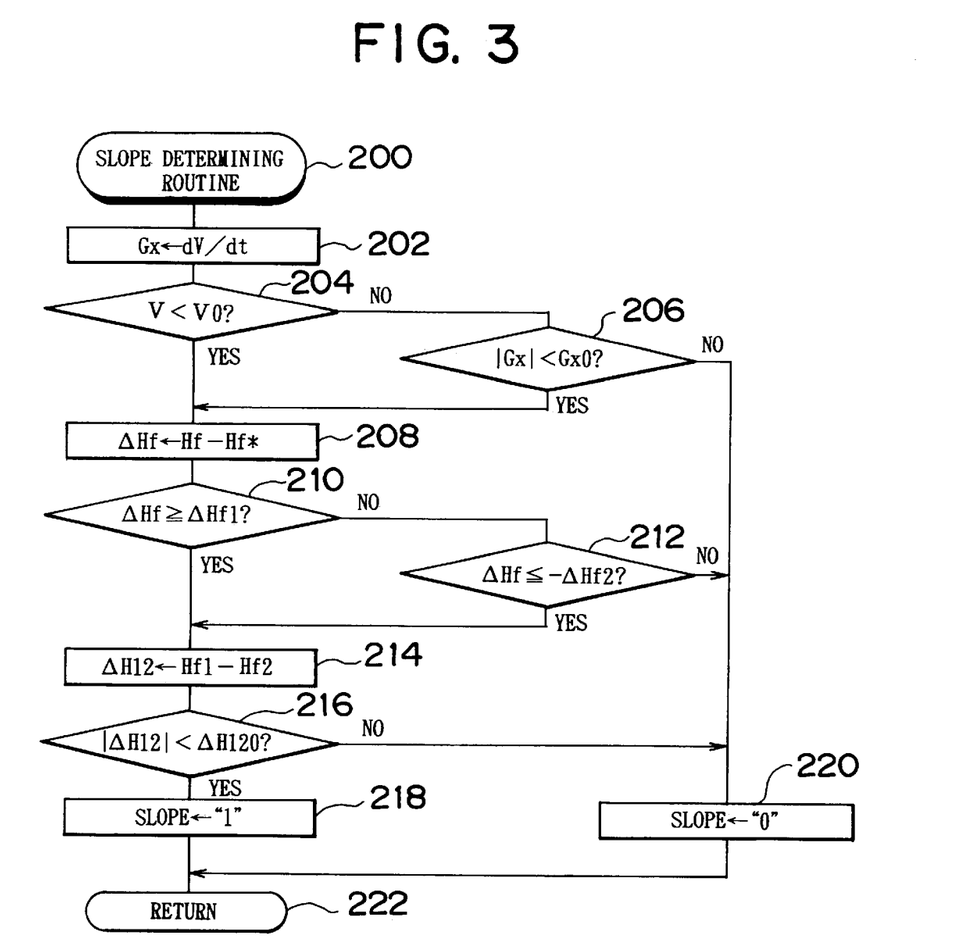
FIG. 3 is a flowchart illustrating in detail the slope determining routine indicated in FIG. 2.

If the vehicle speed V is equal to or greater than the predetermined vehicle speed V0 and the absolute value |Gx| of the acceleration Gx is equal to or greater than the predetermined acceleration Gx0, the microcomputer 30 makes negative determinations in steps 204, 206. Subsequently, the microcomputer 30 sets a slope flag SLOPE to "0" in step 220, and ends the execution of the slope determining routine in step 222. The slope flag SLOPE indicates by "1" that the vehicle is on a slope, and indicates by "0" that the vehicle is not on a slope. In this embodiment, the term "slope" means a steep slope at or above about 30°.

Conversely, if the vehicle speed V is less than the predetermined vehicle speed V0 or the absolute value |Gx| of the acceleration Gx is less than the predetermined acceleration Gx0, the microcomputer 30 makes an affirmative determination in step 204 or 206, and proceeds to step 208. In step 208, the microcomputer 30 calculates the vehicle height deviation ΔHf (=Hf−Hf*) by subtracting the target vehicle height Hf* of the front portion of the vehicle from the actual vehicle height Hf thereof. The program operation then proceeds to the determining process of steps 210, 212. The aforementioned target vehicle height Hf* and a target vehicle height Hr* of the rear portion of the vehicle are stored in a non-volatile memory provided in the microcomputer 30, and can be changed by operating the target vehicle height changing switch 31 described below.

In step 210, it is determined whether the vehicle height deviation ΔHf is equal to or greater than a predetermined positive value ΔHf1. The predetermined value ΔHf1 is set to a value that is slightly less than a value by which the front portion of the vehicle body 10 rises when the vehicle is on a upslope that ascends in the travelling direction of the vehicle. In step 212, it is determined whether the vehicle height deviation ΔHf is equal to or less than a predetermined negative value −ΔHf2. The predetermined value −ΔHf2 is set to a value that is slightly greater than (that is, a negative value that is slightly less in absolute value than) a value by which the rear portion of the vehicle body 10 lowers when the vehicle is on a downslope that descends in the travelling direction of the vehicle. If the vehicle height deviation ΔHf is greater than the predetermined value −ΔHf2 and less than the predetermined ΔHf1, that is, if the amount of shift of the actual vehicle height Hf of the front portion of the vehicle body 10 upward or downward from the target vehicle height Hf* is less than the predetermined value ΔHf1 or |−ΔHf2|, the microcomputer 30 makes negative determinations in steps 210, 212. Subsequently, the microcomputer 30 sets the slope flag SLOPE to "0" in step 220, and ends the execution of the slope determining routine in step 222.

Conversely, if the vehicle height deviation ΔHf is equal to or greater than the predetermined value ΔHf1 or equal to or less than the predetermined value −ΔHf2, the microcomputer 30 makes an affirmative determination in step 210 or 212, and proceeds to step 214.

In step 214, the microcomputer 30 determines a left-right vehicle height difference ΔH12 (=Hf1−Hf2) in the front portion of the vehicle body 10 by calculating the difference between the actual vehicle heights Hf1 and Hf2. In step 216, it is determined whether the absolute value |ΔH12| of the left-right vehicle height difference ΔH12 is less than a predetermined value ΔH120. The determining processing of step 216 serves to determine whether the vehicle is on a road surface with many bumps and recesses (irregular road surface). If the vehicle is on an irregular road surface so that the vehicle height difference between the left and right front wheel positions is great, more specifically, the absolute value |ΔH12| is equal to or greater than the predetermined value ΔH120, the microcomputer 30 makes a negative determination in step 216. Subsequently, the microcomputer 30 sets the slope flag SLOPE to "0" in step 220, and ends the execution of the slope determining routine in step 222. Conversely, if the vehicle is not on an irregular road surface so that the vehicle height difference between the left and right front wheel positions is small, more specifically, the absolute value |ΔH12| is less than the predetermined value ΔH120, the microcomputer 30 sets the slope flag SLOPE to "1" in step 218, and ends the execution of the slope determining routine in step 222.

In the slope determining routine, therefore, in a case where the vehicle speed V is less than the predetermined vehicle speed V0 or the absolute value |Gx| of the acceleration Gx of the vehicle in the forward-rearward direction is less than the predetermined acceleration Gx0, and where the left-right vehicle height difference ΔH12 between the vehicle heights Hf1 and Hf2 at the left and right front wheel positions is less than the predetermined value ΔH120, and where the vehicle height Hf of the front portion of the vehicle body 10 deviates upward by at least the predetermined value ΔHf1 or downward by at least the predetermined value ΔHf2 from the target vehicle height Hf*, the microcomputer 30 determines that the vehicle is on a slope, and sets the slope flag SLOPE to "1". This determining operation is based on the following reasons. That is, if the vehicle is on a steep slope (a slope at or above an angle of about 30°), the vehicle normally cannot run at an intermediate or high speed but the vehicle is normally in a low-speed running state or a stopped state, so that the vehicle body will not oscillate up and down to great extents. When the vehicle is on an upslope that ascends in the travelling direction of the vehicle, the front portion of the vehicle body 10 rises and the rear portion of the vehicle body 10 lowers. When the vehicle is on a downslope that descends in the travelling direction of the vehicle, the front portion of the vehicle body 10 lowers and the rear portion of the vehicle body 10 rises. That is, unless the vehicle is rapidly accelerated or decelerated so that the front portion of the vehicle body 10 considerably lowers or rises, the front portion of the vehicle body 10 rises and the rear portion of the vehicle body 10 lowers when the vehicle is on an upward slope; and the front portion of the vehicle body 10 lowers and the rear portion of the vehicle body 10 rises when the vehicle is on a downward slope. The condition of the left-right vehicle height difference ΔH12 being less than the predetermined value ΔH120 is adopted as a slope determination condition because if the left-right vehicle height difference ΔH12 is great, due to bumps and recesses of a road surface, there is a considerable possibility that the vehicle height Hf of the front portion of the vehicle will deviate from the target vehicle height Hf* even if the vehicle is not on a slope.

In the slope determination apparatus employing the slope determining routine, the vehicle height sensors 32a, 32b and the vehicle speed sensor 33 are readily available, that is, the vehicle height sensors 32a, 32b are provided for vehicle height adjustment and the vehicle speed sensor 33 is normally provided in vehicles. Furthermore, the determining operations for the slope determination are executed by the microcomputer 30. Therefore, the slope determination apparatus can be designed in a simple construction and can be produced at low costs. Among the slope determination conditions, the determination condition that the absolute value |ΔH12| of the left-right vehicle height difference ΔH12 is less than the predetermined value ΔH120 may be omitted. If this condition is omitted, sufficiently precise slope determination can still be performed.

Next described will be vehicle height adjust control using the slope flag SLOPE set in the start determining routine. After executing the slope determining routine of step 106 in the main program of FIG. 2, the microcomputer 30 executes the inhibition determining routine, the start determining routine and the vehicle height changing routine in steps 108, 110, 112. First, operations performed in a case where the vehicle is on a slope so that the slope flag SLOPE has been set to "0" will be described.

Figure 4:
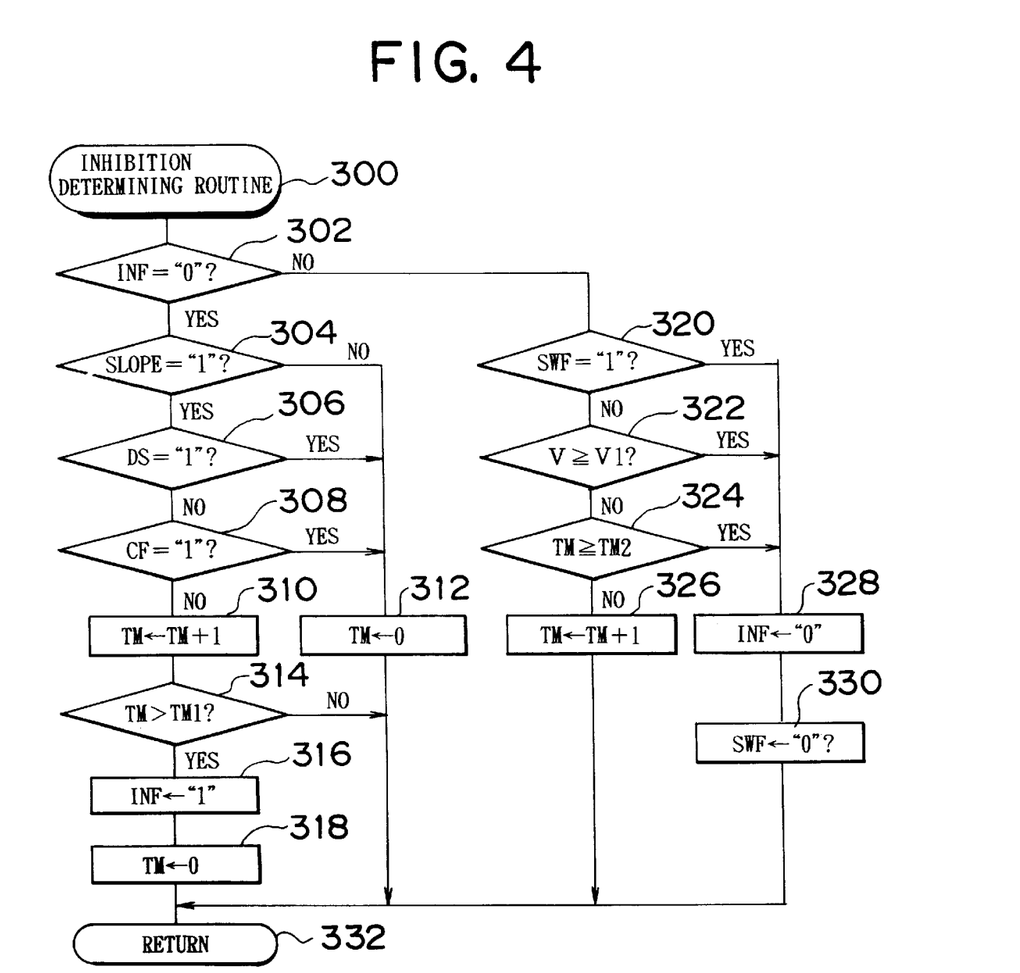
FIG. 4 is a flowchart illustrating in detail the inhibition determining routine indicated in FIG. 2.

The inhibition determining routine is illustrated in detail in FIG. 4. When the inhibition determining routine is started in step 300, the microcomputer 30 determines whether an inhibition flag INF is "0" in step 302. The inhibition flag INF indicates by "1" the inhibition of vehicle height adjust control. The inhibition flag INF is initially set to "0". Therefore, the microcomputer 30 makes an affirmative determination in step 302, and determines in step 304 whether the slope flag SLOPE is "1". Since the slope flag SLOPE has been set to "0", the determination in step 304 becomes negative. Subsequently in step 312, the microcomputer 30 sets a timer count TM described below, to "0". The execution of the inhibition determining routine is then ended in step 332.

Figure 5:
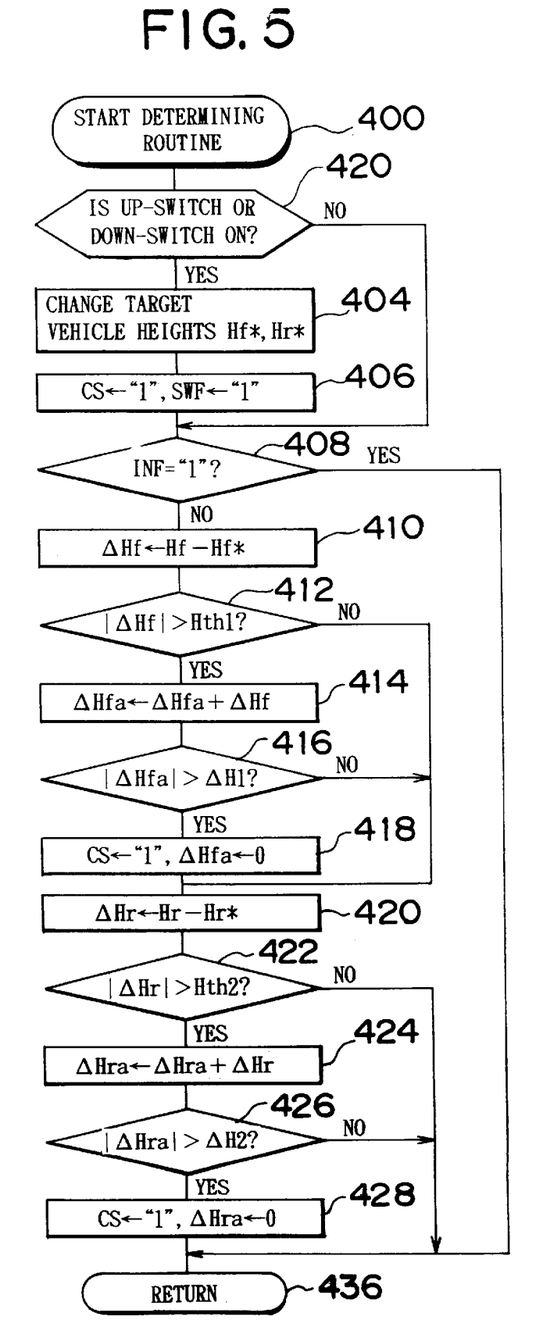
FIG. 5 is a flowchart illustrating in detail the start determining routine indicated in FIG. 2.

Subsequently, the start determining routine is started in step 400 as illustrated in FIG. 5. In step 402, the microcomputer 30 determines whether the up-switch 31a or the down-switch 31b of the target vehicle height changing switch 31 has been turned on. If neither one of the switches 31a, 31b has been turned on, the microcomputer 30 makes a negative determination in step 402, and jumps to step 408. In this case, the target vehicle heights Hf*, Hr* of the front and rear portions of the vehicle body 10 are maintained at values that were previously set or changed and have been stored in the non-volatile memory.

Conversely, if either one of the switches 31a, 31b is turned on, the microcomputer 30 makes an affirmative determination in step 402, and then changes the target vehicle heights Hf*, Hr* in step 404. If the up-switch 31a is turned on, each of the target vehicle heights Hf*, Hr* is increased by one level for every operation of the up-switch 31a until the target vehicle height reaches a preset maximum value. If the down-switch 31b is turned on, each of the target vehicle heights Hf*, Hr* is reduced by one level for every operation of the down-switch 31b until the target vehicle height reaches a preset minimum value. After step 404, the microcomputer 30 sets a change start flag CS and a switch flag SWF to "1" in step 406. The changing flag CF indicates by "1" the start of vehicle height adjustment. The switch flag SWF indicates by "1" that the up-switch 31a or the down-switch 31b has just been turned on.

After the process of steps 402–406, the microcomputer 30 determines in step 408 whether the inhibition flag INF is "1". Since the inhibition flag INF has been set to "0" in this case, the microcomputer 30 makes a negative determination in step 408, and proceeds to step 410. In step 410, the microcomputer 30 calculates a vehicle height deviation $\Delta Hf$ (=Hf−Hf*) by subtracting the target vehicle height Hf* of the front portion of the vehicle body 10 from the actual vehicle height Hf detected in step 104 in the main program. Subsequently in step 412, it is determined whether the absolute value $|\Delta Hf|$ of the vehicle height deviation $\Delta Hf$ is greater than a threshold Hth1 determined beforehand. If the absolute value $|\Delta Hf|$ is not greater than the threshold Hth1, the microcomputer 30 makes a negative determination in step 412, and proceeds to step 420. In step 420, the microcomputer 30 calculates a vehicle height deviation $\Delta Hr$ (=Hr−Hr*) by subtracting the target vehicle height Hr* of the rear portion of the vehicle body 10 from the detected actual vehicle height Hr of the rear portion thereof. Subsequently in step 422, it is determined whether the absolute value $|\Delta Hr|$ of the vehicle height deviation $\Delta Hr$ is greater than a threshold Hth2 determined beforehand. If the absolute value $|\Delta Hr|$ is not greater than the threshold Hth2, the microcomputer 30 makes a negative determination in step 422, and ends the execution of the start determining routine in step 430.

Next described will be an operation performed in a case where the actual vehicle heights Hf, Hr of the front and rear portions of the vehicle body 10 are changed due to a change in the number of occupants, a change in the baggage weight, and the like. If the actual vehicle height Hf of the front portion of the vehicle body 10 increases or decreases so that the absolute value $|\Delta Hf|$ of the vehicle height deviation $\Delta Hf$ becomes greater than the threshold Hth1, the microcomputer 30 makes an affirmative determination in step 412 in the start determining routine in FIG. 5. Subsequently in step 414, the microcomputer 30 calculates an accumulated value $\Delta Hfa$ of vehicle height deviations $\Delta Hf$ by performing an arithmetic operation represented by expression (1).

$$\Delta Hfa = \Delta Hfa + \Delta Hf \quad (1)$$

Until the absolute value $|\Delta Hfa|$ of the accumulated value $\Delta Hfa$ becomes greater than a predetermined positive value $\Delta H1$, the microcomputer 30 repeatedly makes a negative determination in step 416. Because the accumulated value $\Delta Hfa$ is initially cleared to zero and because step 414 is executed every predetermined time, the accumulated value $\Delta Hfa$ is substantially equivalent to the integral of the vehicle height deviation $\Delta Hf$ (the amount of shift of the actual vehicle height Hf from the target vehicle height Hf*). If the absolute value $|\Delta Hfa|$ of the accumulated value $\Delta Hfa$ becomes greater than the predetermined value $\Delta H1$, the microcomputer 30 makes an affirmative determination in step 416. Then in step 418, the microcomputer 30 sets the change start flag CS to "1", and clears the accumulated value $\Delta Hfa$ to zero.

If the actual vehicle height Hr of the rear portion of the vehicle body 10 is changed so that the absolute value $|\Delta Hr|$ of the vehicle height deviation $\Delta Hr$ of the rear portion becomes greater than the threshold Hth2, the microcomputer 30 makes an affirmative determination in step 422, and proceeds to step 424. In step 424, the microcomputer 30 calculates an accumulated value $\Delta Hra$ of vehicle height deviations $\Delta Hr$ by performing an arithmetic operation represented by expression (2).

$$\Delta Hra = \Delta Hra + \Delta Hr \quad (2)$$

Until the absolute value $|\Delta Hra|$ of the accumulated value $\Delta Hra$ becomes greater than a predetermined positive value $\Delta H2$, the microcomputer 30 repeatedly makes a negative determination in step 426. Because the accumulated value $\Delta Hra$ is initially cleared to zero and because step 424 is executed every predetermined time, the accumulated value $\Delta Hra$ is substantially equivalent to the integral of the vehicle height deviation $\Delta Hr$ (the amount of shift of the actual vehicle height Hr from the target vehicle height Hr*). If the absolute value $|\Delta Hra|$ of the accumulated value $\Delta Hra$ becomes greater than the predetermined value $\Delta H2$, the microcomputer 30 makes an affirmative determination in step 426. Then in step 428, the microcomputer 30 sets the change start flag CS to "1", and clears the accumulated value $\Delta Hra$ to zero.

Through the start determining routine, therefore, the change start flag CS is set to "1" in a case where the up-switch 31a or the down-switch 31b is operated so that the target vehicle heights Hf*, Hr* are changed, and in a case where the actual vehicle height Hf or Hr of the front or rear portions of the vehicle body 10 deviates from the corresponding target vehicle height Hf* or Hr* so that the absolute value $|\Delta Hfa|$ of the accumulated value $\Delta Hfa$ becomes greater than the predetermined value $\Delta H1$ or so that the absolute value $|\Delta Hra|$ of the accumulated value $\Delta Hra$ becomes greater than the predetermined value $\Delta H2$. In the other cases, the change start flag CS is maintained at "0".

Figure 6:
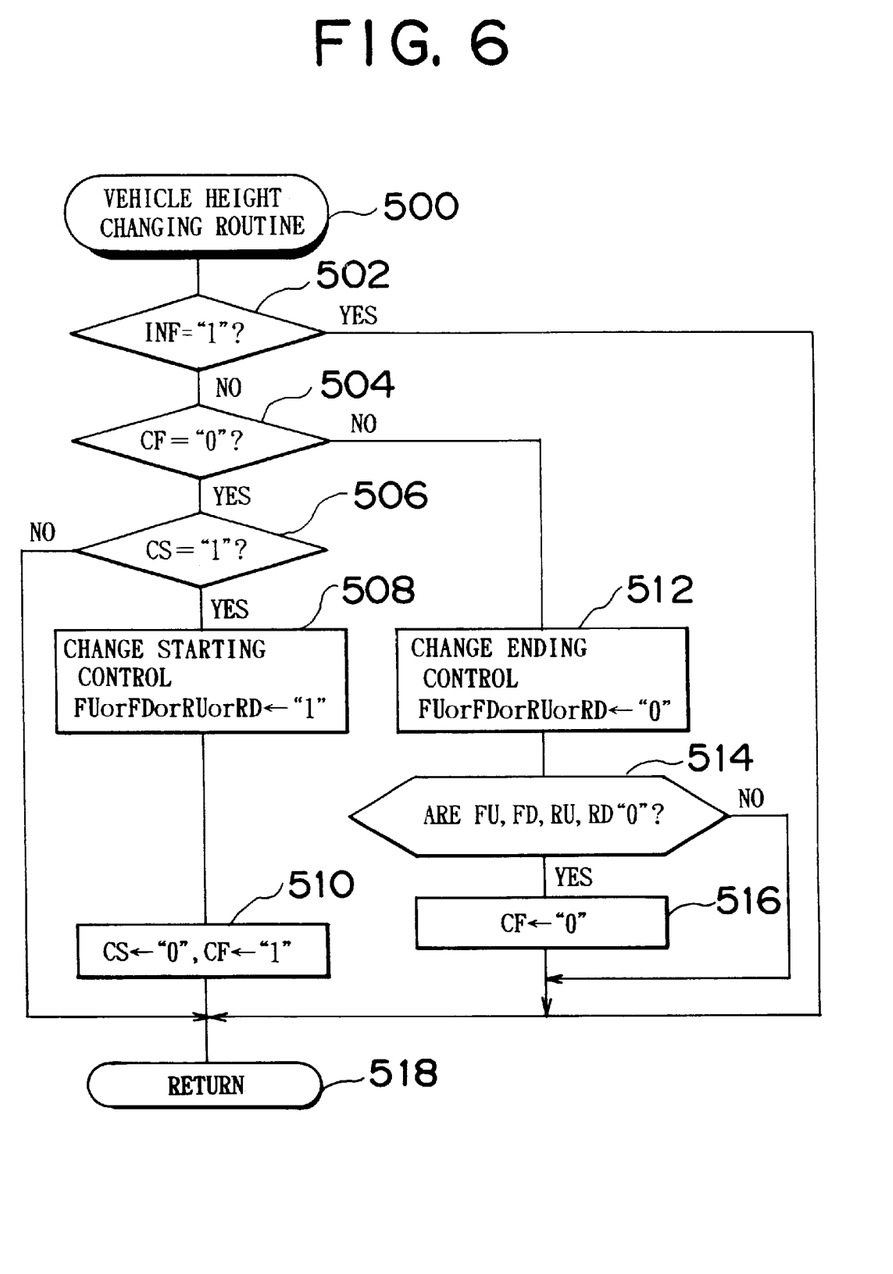
FIG. 6 is a flowchart illustrating in detail the vehicle height changing routine indicated in FIG. 2.

After executing the start deter-mining routine, the microcomputer 30 starts the vehicle height changing routine in step 500 in FIG. 6. In step 502, the microcomputer 30 determines whether the inhibition flag INF is "1". Since the inhibition flag INF has been set to "0" in this case as described above, the microcomputer 30 makes a negative determination in step 502, and then determines in step 504 whether a changing flag CF is "0". The changing flag CF indicates by "1" that the vehicle height adjust control is being performed. Since the changing flag CF is initially set to "0", the determination in step 504 becomes affirmative, and the program operation proceeds to step 506. In step 506, it is determined whether the change start flag CS is "1".

If the change start flag CS has not been set to "1" by the start determining routine, the microcomputer 30 makes a negative determination in step 506, and ends the execution of the vehicle height changing routine in step 518.

Figure 7:
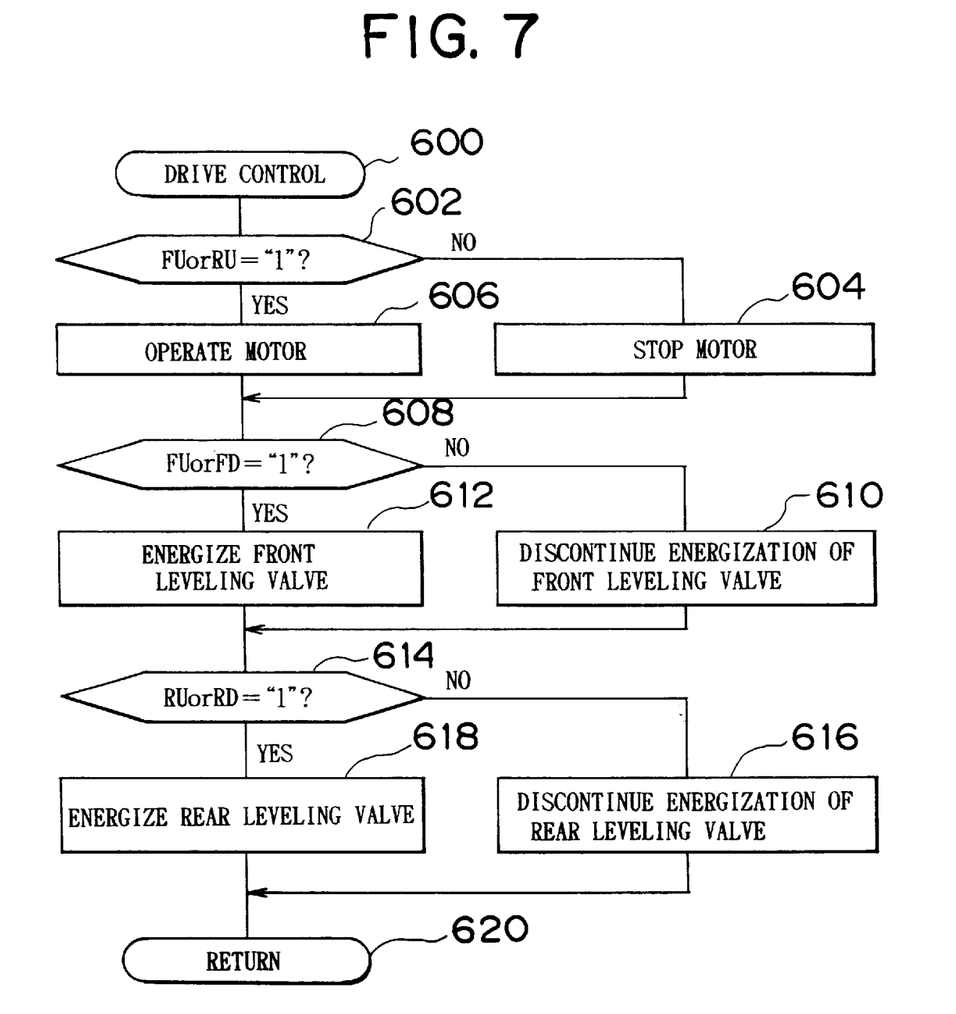
FIG. 7 is a flowchart illustrating a drive control program executed by the microcomputer shown in FIG. 1.

Besides the execution of the main program, the microcomputer 30 executes the drive control program illustrated in FIG. 7. When the execution of the drive control program is started in step 600, the process of steps 602 through 618 controls the electric motor 21 and the leveling valves 25, 26 corresponding to the set states of a front raising flag FU, a front lowering flag FD, a rear raising flag RU and a rear lowering flag RD. These flags indicate performance of the raising and lowering controls of the front and rear portions of the vehicle body 10, respectively. In this case, since all the flags FU, FD, RU, RD are kept at "0" by the initial setting, the microcomputer 30 stops the electric motor 21 by the process of steps 602, 604, and sets the leveling valve 25 to the non-energized state by the process of steps 608, 610, and sets the leveling valve 26 to the non-energized state by the process of steps 614, 616. As a result, the hydraulic pressure in the hydraulic cylinders 11a, 11b is maintained, and the hydraulic pressure in the hydraulic cylinders 11c, 11d is maintained, so that the vehicle heights of the front and rear portions of the vehicle body 10 are maintained at levels where they have been.

If the change start flag CS is set to "1" by the start determining routine, the microcomputer 30 makes an affirmative determination in step 506 in the vehicle height changing routine in FIG. 6, and then executes a change starting control processing in step 508. In the change starting control processing, one or two of the front raising flag FU, the front lowering flag FD, the rear raising flag RU and the rear lowering flag RD are set to "1". More specifically, if the target vehicle heights Hf*, Hr* are changed as described above, or if the load on the entire vehicle body 10 is changed so that both actual vehicle heights Hf, Hr of the front and rear portions of the vehicle body 10 deviate upward or downward from the target vehicle heights Hf*, Hr*, the front raising flag FU and the rear raising flag RU are set to "1" and the front lowering flag FD and the rear lowering flag RD are maintained at "0"; alternatively, the front lowering flag FD and the rear lowering flag RD are set to "1" and the front raising flag FU and the rear raising flag RU are maintained at "0". If the load on a portion of the vehicle body 10 is changed so that only one of the actual vehicle heights Hf, Hr deviates upward or downward from the corresponding target vehicle height Hf* or Hr*, the corresponding one of the front raising flag FU, the front lowering flag FD, the rear raising flag RU and the rear lowering flag RD is set to "1", and the other flags are maintained at "0". In this operation, it never happens that one of the front raising flag FU and the rear raising flag RU and one of the front lowering flag FD and the rear lowering flag RD are simultaneously set to "1".

After executing step 508, the microcomputer 30 sets the change start flag CS back to "0" and sets the changing flag CF to "1" in step 510, and ends the execution of the vehicle height changing routine in step 518.

When the drive control program of FIG. 7 is executed in the conditions set as described above, the electric motor 21 is driven by the process of steps 602, 606 if both or one of the front raising flag FU and the rear raising flag RU has been set to "1". Therefore, the hydraulic pump 22 draws hydraulic fluid from the reservoir 23 and ejects it into the fluid passage P5. In response to the ejecting fluid pressure, the discharge valve 27 is switched to the non-conveying state. If the front raising flag FU is "1", the leveling valve 25 is energized by the process of steps 608, 612, so that hydraulic fluid, ejected by the hydraulic pump 22, is supplied to the hydraulic cylinders 11a, 11b through the fluid passages P6, P1, P2. Therefore, the hydraulic cylinders 11a, 11b start to raise the positions of the vehicle body 10 relative to the left and right front wheels W1, W2. If the rear raising flag RU is "1", the leveling valve 26 is energized by the process of steps 614, 618, so that hydraulic fluid, ejected by the hydraulic pump 22, is supplied to the hydraulic cylinders 11c, 11d through the fluid passages P7, P3, P4. Therefore, the hydraulic cylinders 11c, 11d start to raise the positions of the vehicle body 10 relative to the left and right rear wheels W3, W4.

Conversely, if both or one of the front lowering flag FD and the rear lowering flag RD has been set to "1" and, therefore, the front raising flag FU and the rear raising flag RU are maintained at "0", the electric motor 21 is stopped by the process of steps 602, 604. Therefore, the hydraulic pump 22 does not eject hydraulic fluid, so that the discharge valve 27 is maintained in the conveying state. If the front lowering flag FD is "1", the leveling valve 25 is energized by the process of steps 608, 612, so that hydraulic fluid is discharged from the hydraulic cylinders 11a, 11b into the reservoir 23 through the fluid passages P1, P2, P6, P5 and the discharged valve 27. Therefore, the positions of the vehicle body 10 relative to the left and right front wheels W1, W2 start to lower. If the rear lowering flag RD is "1", the leveling valve 26 is energized by the process of steps 614, 618, so that hydraulic fluid is discharged from the hydraulic cylinders 11c, 11d into the reservoir 23 through the fluid passages P3, P4, P7, P5 and the discharge valve 27. Therefore, the positions of the vehicle body 10 relative to the left and right rear wheels W3, W4 start to lower.

When the entire vehicle body 10 or a portion thereof starts to rise or lower through the operation described above, the microcomputer 30 makes a negative determination in step 504 in FIG. 6 since the changing flag CF has been set to "1" by execution of step 510. Therefore, the microcomputer 30 starts executing a change ending control processing in step 512. In the change ending control processing, the microcomputer 30 compares the target vehicle heights Hf*, Hr* and the actual vehicle heights Hf, Hr of the front and rear portions of vehicle body 10 while the vehicle height is being increased or reduced. When the actual vehicle height Hf becomes substantially equal to the target vehicle height Hf* or when the actual vehicle height Hr becomes substantially equal to the target vehicle height Hr*, the corresponding one of the flags FU, FD, RU and RD, that is, the flag corresponding to the actual vehicle height Hf or Hr that has substantially reached the target vehicle height Hf* or Hr*, is set back to "0". When all the flags FU, FD, RU and RD have been set back to "0", the microcomputer 30 makes an affirmative determination in step 514, and sets the changing flag CF back to "0" in step 516. In short, if both the front raising flag FU and the rear raising flag RU are set to "1", or if both the front lowering flag FD and the rear lowering flag RD are set to "1", only the flag regarding the portion of the vehicle body 10 where the actual vehicle height Hf or Hr has become substantially equal to the target vehicle height Hf* or Hr* is set back to "0", while the flag regarding the portion where the actual vehicle height Hf or Hr has not become substantially equal to the target vehicle height Hf* or Hr* is maintained at "1". After the actual vehicle heights Hf and Hr of the front and rear portions of the vehicle body 10 have become substantially equal to the respective target vehicle heights Hf* and Hr*, the changing flag CF is set back to "0". In this operation, however, if both actual vehicle heights Hf, Hr of the front and rear portions of the vehicle body 10 have simultaneously become substantially equal to the respective target vehicle heights Hf*, Hr*, both flags are immediately set back to "0", and the changing flag CF is also set back to "0".

After all of the front raising flag FU, the front lowering flag FD, the rear raising flag RU and the rear lowering flag RD have been set back to "0", the vehicle heights of the vehicle body 10 at the individual wheel positions are maintained at the target vehicle heights by execution of the drive control program of FIG. 7, as in the initial operation described above.

By the operation described above, the vehicle height adjustment is started if the target vehicle height changing switch 31 is operated, or if the absolute value |ΔHf| of the vehicle height deviation ΔHf of the front portion of the vehicle body 10 continues to be greater than the threshold Hth1 so that the absolute value |ΔHfa| of the accumulated value ΔHfa exceeds the predetermined value ΔH1, or if the absolute value |ΔHr| of the vehicle height deviation ΔHr of the rear portion of the vehicle body 10 continues to be greater than the threshold Hth2 so that the absolute value |ΔHra| of the accumulated value ΔHra exceeds the predetermined value ΔH2. In this manner, the actual vehicle height Hf or Hr of the front or rear portion of the vehicle body 10 is adjusted to the target vehicle height Hf* or Hr*.

Next described will be an operation executed in a case where the vehicle is on a slope and the slope flag SLOPE has been set to "1" by the slope determining routine. In this case, the microcomputer 30 makes an affirmative determination in step 302 in the inhibition determining routine of FIG. 4, and then makes an affirmative determination in step 304, and proceeds to step 306. In step 306, it is determined whether the door switch signal DS is "1". If the door switch signal DS is "1", the program operation proceeds to step 308. In step 308, it is determined whether the changing flag CF is "1". The door switch signal DS indicates by "1" that at least one of the doors is open, and indicates by "0" that all the doors are closed, as described above. If any of the doors is open, that is, there is a high possibility of a change in the number of occupants or a change in the load superimposed on the vehicle, or if the changing flag CF is "1", the microcomputer 30 makes an affirmative determination in step 306 or 308. Subsequently, the microcomputer 30 executes the processing of step 312, and ends the execution of the inhibition determining routine in step 332. Through this operation, therefore, if any of the doors is open or if the vehicle height adjust control is being performed, the vehicle height adjust control is allowed, regardless of whether the slope flag SLOPE is "1" or not.

Conversely, if all the doors are closed and the vehicle height adjust control is not being performed, the microcomputer 30 makes negative determinations in steps 306, 308, and proceeds to steps 310, 314. In step 310, "1" is added to the timer count TM. In step 314, it is determined whether the timer count TM has become greater than a predetermined value TM1 (for example, a value corresponding to about 15 seconds). As long as the timer count TM is not greater than the predetermined value TM1, the microcomputer 30 makes a negative determination in step 314, and ends the execution of the inhibition determining routine in step 332.

If the slope flag SLOPE remains at "1" for a length of time that is longer than the time corresponding to the predetermined value TM1 while the door switch signal DS and the changing flag CF are maintained at "0", the timer count TM becomes greater than the predetermined value due to the processing of step 310. In this case, the microcomputer 30 makes an affirmative determination in step 314. Subsequently, the microcomputer 30 sets the inhibition flag INF to "1" in step 316, and clears the timer count TM to 0 in step 318, and ends the execution of the inhibition determining routine in step 332.

When the inhibition flag INF has been set to "1" in this manner, the microcomputer 30 makes an affirmative determination in step 408 in the start determining routine of FIG. 5, so that steps 410–428 are skipped. Similarly, in the vehicle height changing routine of FIG. 6, the microcomputer 30 makes an affirmative determination in step 502, so that steps 504–516 are skipped. Therefore, while the inhibition flag INF is "1", the vehicle height adjust control is prevented.

Furthermore, after the inhibition flag INF has been set to "1", the determination in step 302 in the inhibition determining routine of FIG. 4 becomes negative, so that a process of steps 320–330 for removing the inhibition is executed. In step 320, it is determined whether the switch flag SWF is "1". In step 322, it is determined whether the vehicle speed V is equal to or greater than a predetermined vehicle speed V1 (for example, 15 km/h). In step 324, it is determined whether the timer count TM has become equal to or greater than a predetermined value TM2 (for example, a value corresponding to about 7 seconds). In a case where the target vehicle height changing switch 31 is not operated, and where the vehicle is on a slope and is stopped or running at a low speed, and where the timer count TM is less than the predetermined value TM2, the microcomputer 30 makes negative determinations in steps 320, 322, 324. Subsequently in step 312, the microcomputer 30 adds 1 to the timer count TM, which was initialized to "0" in step 318. While the aforementioned case continues, 1 is added to the timer count TM in every cycle of the process. Since the inhibition flag INF is maintained at "1" in this case, the vehicle height adjust control is continuously inhibited.

If the switch flag SWF is set to "1", or if the vehicle speed V has become equal to or greater than the predetermined vehicle speed V1, or if the timer count TM has become equal to or greater than the predetermined value TM2, the microcomputer 30 makes an affirmative determination in the corresponding one of steps 320–324. Subsequently, the microcomputer 30 changes the inhibition flag INF to "0" in step 328, and sets the switch flag SWF back to "0" in step 330. Therefore, in the start determining routine of FIG. 5, the microcomputer 30 makes a negative determination in step 408, and then executes the process of steps 410–428. In the vehicle height changing routine of FIG. 6, the microcomputer 30 makes a negative determination in step 502, and then executes the process of steps 504–516. Through this operation, the vehicle height adjustment inhibition control is discontinued if the target vehicle height changing switch 31 is operated by an occupant to change the vehicle height, or if the vehicle has moved from the slope onto a substantially horizontal road and the vehicle speed V has become a normal running speed, or if the predetermined length of time has elapsed following the start of vehicle height adjust control. With regard to the conditions for discontinuing the inhibition control, it is not necessary to execute all the determining processings of steps 320, 322, 324. That is, it is possible to omit one or two of the processings of steps 320–324.

As can be understood from the description of the operation of vehicle height adjustment, the foregoing embodiment inhibits the vehicle height adjust control if the vehicle has been on a slope for at least the predetermined length of time, provided that all the doors are closed and the vehicle height adjust control is not being performed. In such a condition, the raising or lowering control of the front or rear portion of the vehicle body 10 is prevented even though the vehicle is on a slope, thereby preventing an event that, immediately after the vehicle has moved from a slope onto a substantially horizontal road, the vehicle has an awkward appearance with considerably different vehicle heights of the front and rear portions of the vehicle body 10, or the vehicle body 10 interferes with a road surface or the like. Furthermore, the vehicle height adjust control is inhibited by the vehicle height adjustment inhibition control in a case, for example, where the lower surface of the front or rear end of the vehicle body 10 gets on a protuberance of a road surface, such as a rock or the like, when, for example, the vehicle is about to be parked, so that the vehicle height of the front or rear portion of the vehicle body 10 becomes very high, regardless of whether the vehicle is on a slope. Therefore, the embodiment advantageously prevents the vehicle height adjust control from being continued to further reduce the vehicle height of the front or rear portion of the vehicle body 10 in the aforementioned case and therefore avoids worsening the situation, that is, prevents an event that the lower surface of the front or rear end of the vehicle body 10 becomes tightly pressed against the protuberance of the road surface.

In the foregoing embodiment, the vehicle height adjust control is inhibited by the process of steps 310–314 in the inhibition determining routine of FIG. 4 if the sloped state of the vehicle continues for at least the predetermined length of time. However, it is also possible to include the process of steps 310–314 in the slope determining routine of FIG. 3 so that if the slope determination is continued for a predetermined length of time, it is determined that the vehicle is on a slope. In this modification, the process of steps 310–314 may be inserted between step 216 and steps 218, 220.

Although the foregoing embodiment calculates the acceleration Gx of the vehicle in the forward-rearward direction in step 202 in the slope determining routine of FIG. 3 by time-differentiating the vehicle speed V, it is also possible to provide an acceleration sensor in the vehicle body 10 for detecting an acceleration in the forward-rearward direction and to use the acceleration detected by the sensor, instead of using the calculated acceleration Gx.

The foregoing embodiment adopts a large deviation of the actual vehicle height Hf from the target vehicle height Hf* of the front portion of the vehicle body 10 as a condition for determining that the vehicle is on a slope, because the change in the actual vehicle height Hr of the rear portion of the vehicle body 10 caused when the vehicle is on a slope more greatly depends on the amount of baggage load than the change in the actual vehicle height Hf of the front portion of the vehicle body 10 caused when the vehicle is on a slope. However, a deviation of the actual vehicle height Hr from the target vehicle height Hr* of the rear portion of the vehicle body 10 may instead be used as a basis for determining whether the vehicle is on a slope, for example, in a vehicle wherein it is impossible to place a large or heavy baggage on the rear portion of the vehicle body 10, or in a case where it is desirable, for reasons in terms of design or the like, that the vehicle height Hr of the rear portion of the vehicle be used as a basis for the slope determination. In this modification a vehicle height sensor is provided at each of the left and right rear positions of the vehicle for detecting vehicle height Hr1, Hr2 at the respective positions. A real vehicle height Hr is calculated by averaging the vehicle heights Hr1, Hr2 (Hr=(Hr1+Hr2)/2) in step 104 in FIG. 2. In steps 208–216 in FIG. 3, the actual vehicle heights Hr, Hr1, Hr2 and the target vehicle height Hr* of the rear portion of the vehicle are used instead of the actual vehicle heights Hf, Hf1, Hf2 and the target vehicle height Hf* of the front portion of the vehicle. Furthermore, it is also possible to determine that the vehicle is on a slope provided that the actual vehicle heights Hf, Hr of the front and rear portions of the vehicle have considerably deviated from the respective target vehicle heights Hf*, Hr*.

Although the foregoing embodiment inhibits both the raising control and the lowering control of the vehicle body 10 when it is determined that the vehicle is on a slope, it is also possible to inhibit only the lowering control of the vehicle body 10 when it is determined that the vehicle is on a slope because the lowering of the vehicle body 10 can be relatively quickly performed due to the vehicle's own weight. In this modification, the process of steps 410–428 in the start determining routine of FIG. 5 may be changed so that at the time of slope determination, the process of determining whether the vehicle height deviations ΔHf, ΔHr of the front and rear portions of the vehicle have become less than respective negative thresholds are allowed, and the process of determining whether the vehicle height deviations ΔHf, ΔHr of the front and rear portions of the vehicle have become greater than respective positive thresholds are inhibited. It is also possible to modify the vehicle height changing routine of FIG. 6 so that at the time of slope determination, it is determined whether the vehicle height deviations ΔHf, ΔHr of the front and rear portions of the vehicle have become greater than respective positive thresholds, and so that the process of steps 504–516 is inhibited only at the time of the slope determination. Further, it is also possible to omit the determining processing of step 212 in FIG. 3 so that when the determination in step 210 is negative, the program operation proceeds to step 220, that is, it is determined that the vehicle is on a slope only when the vehicle height deviation ΔHf is equal to or greater than the predetermined value ΔHtf|.

Although the foregoing embodiment performs control such that the actual vehicle heights Hf, Hr of the front and rear portions of the vehicle are adjusted to the target vehicle heights Hf*, Hr*, it is also possible to detect the actual vehicle heights at the individual wheel positions and, using the detected actual vehicle heights, adjust the vehicle heights of the vehicle body 10 at the individual wheel positions to the respective target vehicle heights. For example, in this modification, the vehicle height sensors at the left and right front wheel positions can constitute a front vehicle height detection device, and the vehicle height sensors at the left and right rear wheel positions can constitute a rear vehicle height detection device.

Although in the foregoing embodiment, the invention is applied to a hydraulic vehicle height adjust apparatus, the invention may also be applied to vehicle height adjust apparatuses employing other types of fluids, for example, a pneumatic vehicle height adjust apparatus using air. In the application to a pneumatic vehicle height adjust apparatus, the hydraulic pump 22 and the hydraulic cylinders 11*a*–11*d* are replaced by a pneumatic pump and pneumatic cylinders, and the various valves 25–28 and the like are also replaced by pneumatic valves and the like.

Although in the foregoing embodiment, the result of determination as to whether the vehicle is on a slope is used only for the vehicle height adjust control, the result of determination may also be used for the control of damping force in shock absorbers, the control of a drive system that produces drive force, the control of a braking system that produces braking force, and the like.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A vehicular slope determination apparatus comprising:
   a running state detector that detects a running state of a vehicle including an acceleration of the vehicle in a forward-rearward direction;
   a vehicle height detector that detects a vehicle height of a vehicle; and
   determination means for determining that the vehicle is on a slope and determining whether the acceleration detected by the running state detector is less than a predetermined acceleration and whether the running state is other than a rapidly accelerating or decelerating state when the running state detected by the running state detector is a predetermined state and the vehicle height detected by the vehicle height detector is shifted at least a predetermined value from a predetermined target vehicle height.

2. A vehicular slope determination apparatus according to claim 1, wherein the running state detector detects a vehicle speed, and the determination means determines whether the running state is a stopped state or a low-speed running state where the vehicle speed is less than a predetermined speed.

3. A vehicular slope determination apparatus according to claim 1, wherein the vehicle height detector detects a vehicle height of at least one of a front portion of the vehicle and a rear portion of the vehicle.

4. A vehicular slope determination apparatus according to claim 3, wherein the vehicle height detector detects a vehicle height at each of right and left positions in at least one of the front portion of the vehicle and the rear portion of the vehicle, and includes means for determining a vehicle height of the at least one of the front portion of the vehicle and the rear portion of the vehicle by averaging the vehicle heights detected at the right and left positions, and wherein the determination means for determining that the vehicle is on a slope determines whether a difference between the detected vehicle heights is less than a predetermined value and whether the determined vehicle height of the at least one of the front portion of the vehicle and the rear portion of the vehicle is shifted at least the predetermined value from the predetermined target vehicle height.

5. A vehicular slope determination apparatus according to claim 1, wherein, if a deviation of the actual vehicle height from the target vehicle height is equal to or greater than a predetermined value, the determination means determines that the actual vehicle height detected by the vehicle height detector is shifted at least the predetermined value from the predetermined target vehicle height and, therefore, that the vehicle is on a slope.

6. A vehicular slope determination apparatus according to claim 1, wherein, if an accumulated value of deviation of the actual vehicle height from the target vehicle height is equal to or greater than a predetermined value, the determination means determines that the actual vehicle height detected by the vehicle height detector is shifted at least the predetermined value from the predetermined target vehicle height and, therefore, that the vehicle is on a slope.

7. A vehicular slope determination apparatus according to claim 5, wherein after the determination means determines whether the deviation of the actual vehicle height from the target vehicle height is equal to or greater than the predetermined value, the determination means determines whether an accumulated value of the deviation of the actual vehicle height from the target vehicle height is equal to or greater than a predetermined value.

8. A vehicular slope determination apparatus according to claim 1, further comprising inhibition means that, if the determination means determines that the vehicle is on a slope, inhibits a control for adjusting the vehicle height so that the vehicle height becomes substantially equal to the predetermined target vehicle height by controlling an actuator on the basis of the vehicle height detected by the vehicle height detector.

9. A vehicle height adjust control apparatus comprising:
   a front vehicle height detector that detects a front vehicle height of a front portion of a vehicle;
   a rear vehicle height detector that detects a rear vehicle height of a rear portion of the vehicle;
   an actuator capable of changing the front vehicle height of the front portion of the vehicle and the rear vehicle height of the rear portion of the vehicle;
   an adjust controller that adjusts the front vehicle height of the front portion of the vehicle and the rear vehicle height of the rear portion of the vehicle so that the front vehicle height and the rear vehicle height become substantially equal to respective predetermined target vehicle heights, by controlling the actuator on the basis of the front vehicle height detected by the front vehicle height detector and the rear vehicle height detected by the rear vehicle height detector;
   a running state detector that detects a running state of the vehicle including an acceleration of the vehicle in a forward-rearward direction;
   determination means for determining that the vehicle is on a slope and whether the acceleration detected by the running state detector is less than a predetermined acceleration and whether the running state is other than a rapidly accelerating or decelerating state when the running state detected by the running state detector is a predetermined state and at least one of the front vehicle height detected by the front vehicle height detector and the rear vehicle height detected by the rear vehicle height detector is shifted at least a predetermined value from a corresponding one of the predetermined target vehicle heights; and
   inhibition means that inhibits the adjust control if the determination means determines that the vehicle is on a slope.

10. A vehicle height adjust control apparatus according to claim 9, wherein the running state detector detects a vehicle speed, and the determination means determines whether the running state is a stopped state or a low-speed running state where the vehicle speed is less than a predetermined speed.

11. A vehicle height adjust control apparatus according to claim 9, further comprising:
   a door open-closed detector that detects an open state of a door and a closed state of the door; and
   a door controller that, if the open state of the door is detected by the door open-closed detector, prevents vehicle height adjustment from being inhibited by the inhibition means, and allowing vehicle height adjustment to be performed by the adjust controller.

12. A vehicle height adjust control apparatus according to claim 9, wherein, if a deviation of the actual vehicle height from the target vehicle height is equal to or greater than a predetermined value, the determination means determines that the actual vehicle height detected by the vehicle height detector is shifted at least the predetermined value from the predetermined target vehicle height and, therefore, that the vehicle is on a slope.

13. A vehicle height adjust control apparatus according to claim 12, wherein, after the determination means determines whether the deviation of the actual vehicle height from the target vehicle height is equal to or greater than the predetermined value, the determination means determines whether an accumulated value of the deviation of the actual vehicle height from the target vehicle height is equal to or greater than a predetermined value.

14. A vehicle height adjust control apparatus according to claim 9, wherein, if an accumulated value of deviation of the actual vehicle height from the target vehicle height is equal to or greater than a predetermined value, the determination means determines that the actual vehicle height detected by the vehicle height detector is shifted at least the predetermined value from the predetermined target vehicle height and, therefore, that the vehicle is on a slope.

15. A vehicle height adjust control method comprising:
   detecting a running state of the vehicle including an acceleration of the vehicle in a forward-rearward direction;
   detecting a rear vehicle height of a rear portion of the vehicle;
   determining whether the detected running state is a predetermined state and whether at least one of the detected front vehicle height and the detected rear vehicle height is shifted at least a predetermined value from respective predetermined target vehicle heights;
   adjusting the front vehicle height of the front portion of the vehicle and the rear vehicle height of the rear portion of the vehicle so that the front vehicle height and the rear vehicle height becomes substantially equal to the respective predetermined target vehicle heights, on the basis of the detected front vehicle height and the detected rear vehicle height;

determining whether the vehicle is on a slope; and
inhibiting vehicle height adjust control if the vehicle is on a slope.

* * * * *